(12) United States Patent
Hosoya et al.

(10) Patent No.: US 9,430,003 B2
(45) Date of Patent: Aug. 30, 2016

(54) RETRACTABLE TOUCHPAD DEVICES AND METHODS

(71) Applicant: LENOVO (SINGAPORE) PTE. LTD., Singapore (SG)

(72) Inventors: Satoshi Hosoya, Yokohama (JP); Takehito Yamauchi, Singapore (SG)

(73) Assignee: LENOVO (SINGAPORE) PTE. LTD., New Tech Park (SG)

(*) Notice: Subject to any disclaimer, the term of this patent is extended or adjusted under 35 U.S.C. 154(b) by 55 days.

(21) Appl. No.: 14/196,217

(22) Filed: Mar. 4, 2014

(65) Prior Publication Data
US 2015/0253815 A1 Sep. 10, 2015

(51) Int. Cl.
*H05K 5/00* (2006.01)
*G06F 1/16* (2006.01)
*G06F 3/02* (2006.01)

(52) U.S. Cl.
CPC .............. *G06F 1/169* (2013.01); *G06F 3/0213* (2013.01); *G06F 3/0227* (2013.01); *Y10T 29/49002* (2015.01)

(58) Field of Classification Search
CPC .. G06F 1/169; G06F 3/03547; G06F 1/1624; G06F 1/1616; G06F 3/0202; B60K 2350/1024; B60K 2350/1028; G05G 9/047; H01H 13/86
See application file for complete search history.

(56) References Cited

U.S. PATENT DOCUMENTS

| | | | |
|---|---|---|---|
| 6,480,187 B1 | 11/2002 | Sano et al. | |
| 6,757,159 B2* | 6/2004 | Zarek et al. | 361/679.09 |
| 2010/0238138 A1 | 9/2010 | Goertz et al. | |
| 2013/0187891 A1* | 7/2013 | Eriksson et al. | 345/175 |

* cited by examiner

*Primary Examiner* — Robert J Hoffberg
*Assistant Examiner* — Hung Dang
(74) *Attorney, Agent, or Firm* — Nutter McClennen & Fish LLP; John J. Penny, Jr.; Santiago Velez

(57) ABSTRACT

Retractable touchpad devices and methods are provided. In general, an electronic device can include a retractable frame configured to move between a retracted configuration and an expanded configuration. In the retracted configuration, the frame can be contained within a base of the electronic device. In the expanded configuration, the frame can no longer be contained within the base, thereby allowing the frame to provide touchpad functionality when in the expanded configuration. The retractable frame can thus be configured to selectively provide touchpad functionality for the electronic device based on whether the frame is retracted or expanded. The retractable frame can be configured to be retracted in a variety of ways, such as by including a foldable member configured to be unfolded and folded so as to selectively provide touchpad access, or by including a slidable member configured to be slid so as to selectively provide touchpad access.

18 Claims, 14 Drawing Sheets

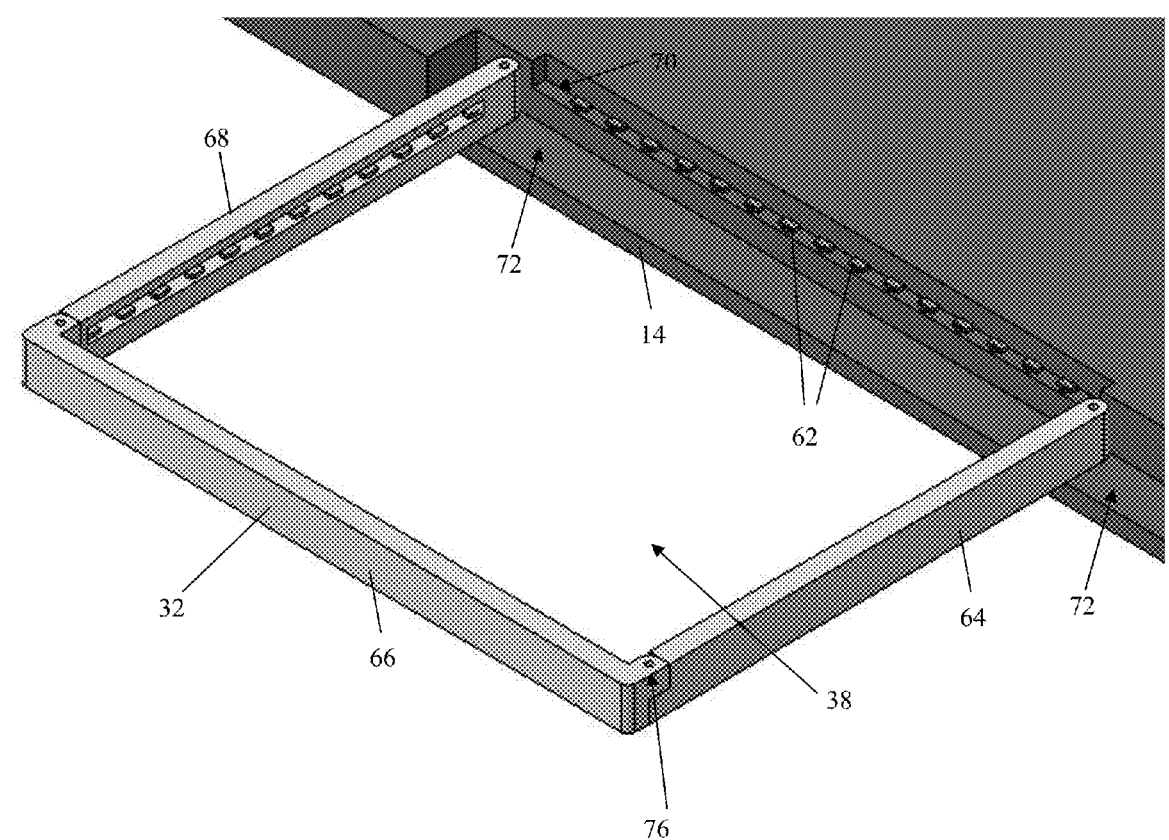

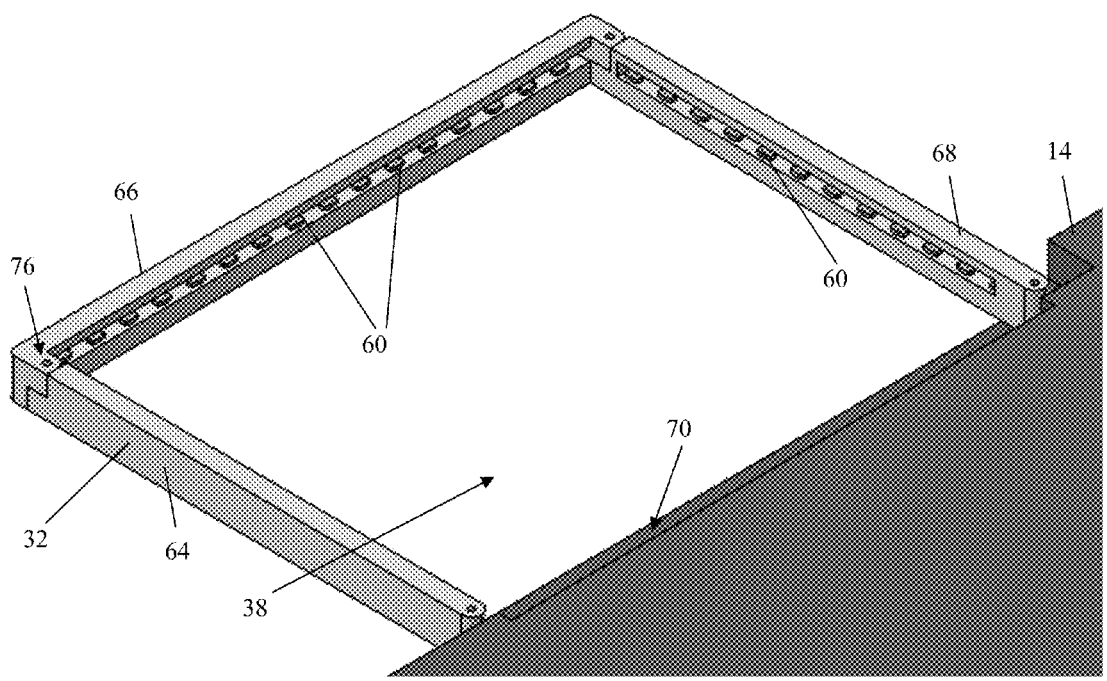
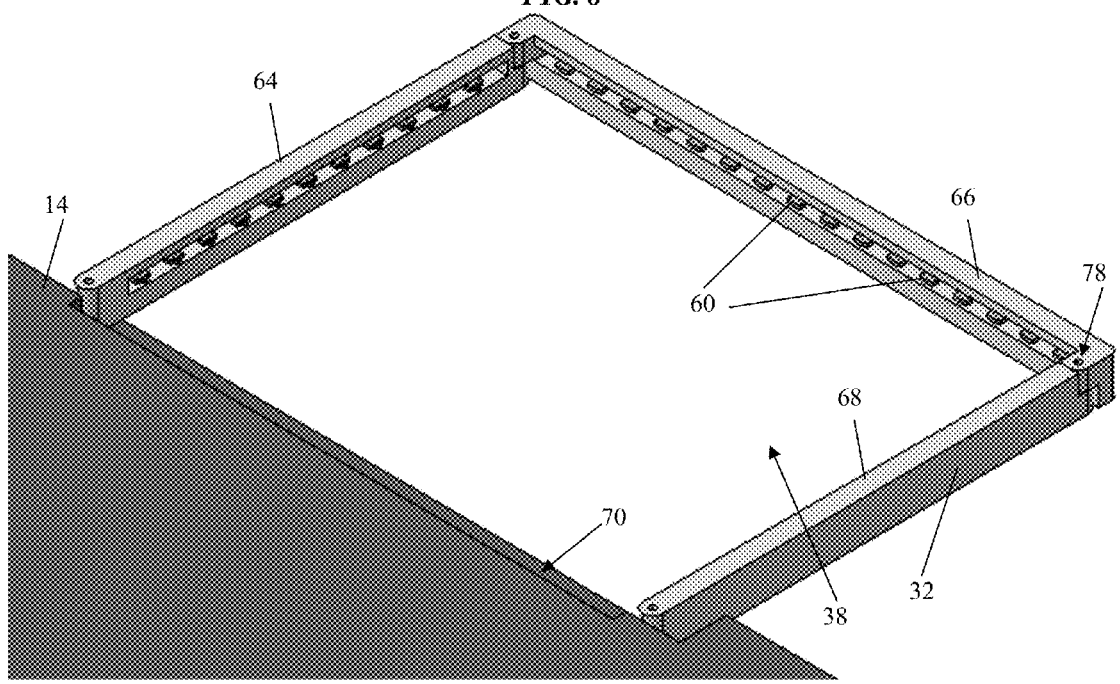

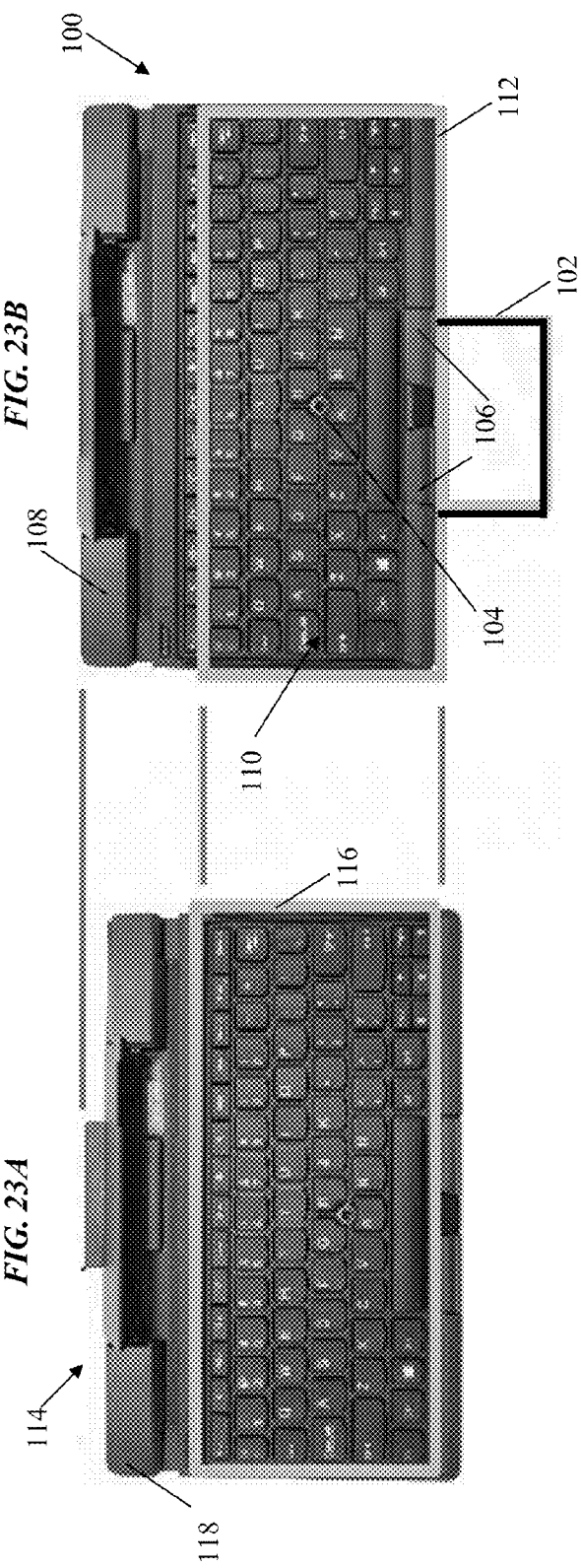
FIG. 23B
FIG. 23A
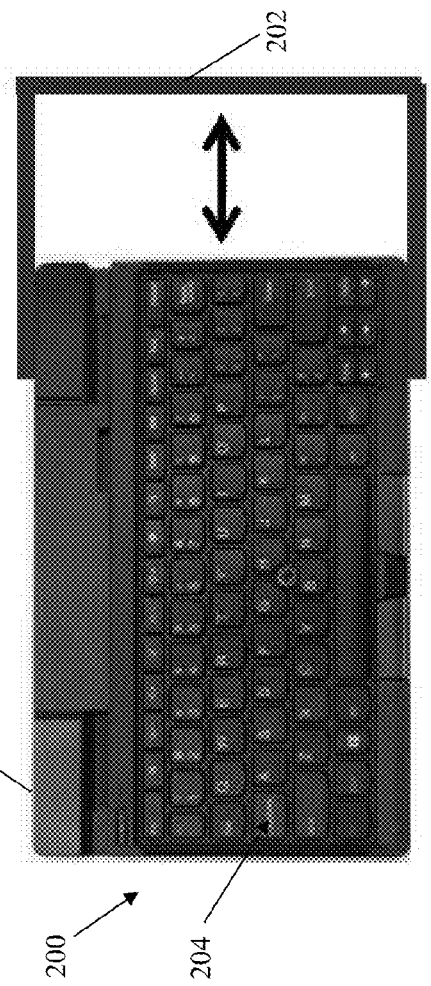
FIG. 24

RETRACTABLE TOUCHPAD DEVICES AND METHODS

FIELD OF THE INVENTION

The present invention relates generally to touchpads, and more particularly to retractable touchpad devices and methods.

BACKGROUND OF THE INVENTION

Electronic devices such as notebook computers frequently use touchpads to receive spatial input. For example, a touchpad can be used to control a pointing device such as a cursor. The user can touch the touchpad, typically with a finger, and the contact from touching can be detected and translated into electrical input signals to control the pointing device.

Touchpads are often positioned on an electronic device between a user of the electronic device and a keyboard of the electronic device. As a result, the electronic device must provide room for the touchpad below the keyboard on a base of the electronic device. The base must therefore have a certain minimum size, which can increase an overall size of the electronic device. The electronic device can thus be bulky and/or can have unused, wasted space on the base on either side of the touchpad that is located below the keyboard. Even if a touchpad is located on the electronic device at a position other than below the keyboard, such as to the left or the right of the keyboard, the touchpad can still cause the electronic device to be bulky and/or have unused, wasted space on the base next to the touchpad.

Accordingly, there remains a need for improved touchpads.

SUMMARY OF THE INVENTION

A device is provided that in one embodiment includes a base of an electronic device. a frame attached to the base, a plurality of light sources, and a plurality of sensors. The frame can define a perimeter that surrounds an area. The plurality of light sources and the plurality of sensors can be attached to the frame along the perimeter thereof. The frame can be configured to move between a first configuration, in which the frame is retracted and the area is inaccessible so as to prevent receipt of a touch input thereto from a user, and, and a second configuration, in which the frame is expanded and the area is accessible so as to allow receipt of the touch input thereto form the user.

The device can vary in any number of ways. For example, the base can define a maximum perimeter. When the frame is in the first configuration, the frame can be contained entirely within the maximum perimeter. When the frame is in the second configuration, at least a portion of the frame can be positioned outside the maximum perimeter. For another example, the frame can have a different shape in the first configuration than in the second configuration. For yet another example, the frame can be configured to move between the first and second positions by pivoting a first end of the frame relative to the base and pivoting a second end of the frame relative to the base. For still another example, the frame can include a first leg including a first end hingedly attached to the base and including a second end, a second leg including a third end and including a fourth end hingedly attached to the second end, and a third leg including a fifth end hingedly attached to the base and including a sixth end hingedly connected to the third end. For another example, the frame can have a same shape in the first configuration and in the second configuration, and the frame can be configured to slidably move between the first and second positions. For yet another example, the base can have a keyboard thereon.

In another embodiment, a device is provided that includes a base of an electronic device, a frame attached to the base, a plurality of sensors attached to the frame, and a plurality of light sources attached to the frame. The frame can be selectively movable between a folded configuration and an unfolded configuration. The frame moving from the folded configuration to the unfolded configuration can cause the frame to define a perimeter of a shape. The plurality of sensors and the plurality of light sources can be movable with the frame between the folded and unfolded configurations. The plurality of light sources and the plurality of sensors can be contained within the perimeter of the shape.

The device can have any number of variations. For example, the frame can include a plurality of legs. The plurality of sensors and the plurality of light sources can be disposed within the plurality of legs, and the legs can form the perimeter of the shape. When the frame is in the folded configuration, the legs can be in line with each other, and when the frame is in the unfolded configuration, the legs can be in a U-shape. For another example, the frame can include a first leg including a first end and including a second end, a second leg including a third end and including a fourth end, and a third leg including a fifth end and including a sixth end. The first end can be hingedly attached to the base, the third end can be hingedly attached to the second end; the fifth end can be hingedly connected to the third end, and the sixth end can be hingedly attached to the base. For yet another example, the base can have a keyboard thereon.

In another aspect, a method is provided that in one embodiment includes expanding a frame attached to a base of an electronic device so as to move the frame from a first configuration, in which a plurality of sensors attached to the frame are unaligned from a plurality of light sources attached to the frame such that the plurality of sensors are unable to sense light emitted from the plurality of lights sources, to a second configuration, in which the plurality of sensors are aligned with plurality of light sources such that the plurality of sensors are configured to sense light emitted from the plurality of lights sources.

The method can vary in any number of ways. For example, the expanding can include pivoting the frame relative to the base. For another example, the expanding can include sliding the frame relative to the base. For yet another example, the expanding can change a shape of the frame from a first shape to a second, different shape. For still another example, the expanding can cause the frame to move from being contained within a maximum perimeter defined by the base to being at least partially located outside the maximum perimeter defined by the base.

BRIEF DESCRIPTION OF THE DRAWINGS

The invention will be more fully understood from the following detailed description taken in conjunction with the accompanying drawings, in which:

FIG. 6 is another perspective, partial view of the bottom side of the electronic device and the frame of FIG. 4;

FIG. 7 is yet another perspective, partial view of the bottom side of the electronic device and the frame of FIG. 4;

FIG. 8 is still another perspective, partial view of the bottom side of the electronic device and the frame of FIG. 4;

FIG. 23A is a top view of one prior art electronic device;

FIG. 23B is a top view of another embodiment of an electronic device including a retractable frame, the frame being in a retracted configuration; and FIG. 24 is a top view of another embodiment of an electronic device including a retractable frame, the frame being in an expanded configuration.

DETAILED DESCRIPTION OF THE INVENTION

Figure 1B:
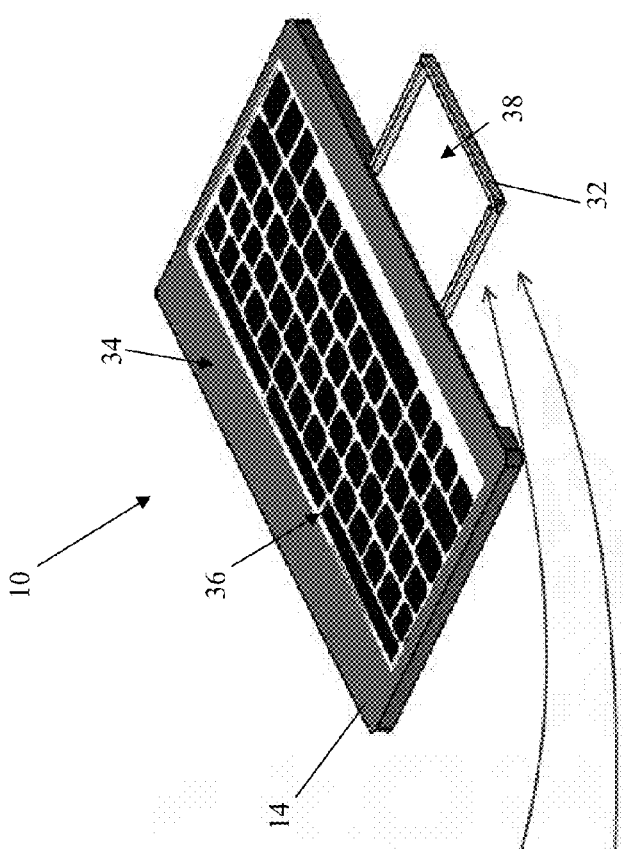
FIG. 1B is a perspective view of an embodiment of an electronic device including a retractable frame.

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In the present disclosure, like-named components of the embodiments generally have similar features, and thus within a particular embodiment each feature of each like-named component is not necessarily fully elaborated upon. Sizes and shapes of devices and components of electronic devices discussed herein can depend at least on the electronic devices in which the devices and components will be used.

Various exemplary retractable touchpad devices and methods are provided. In general, an electronic device can include a retractable frame configured to move between a retracted configuration and an expanded configuration. In the retracted configuration, the frame can be contained within a base of the electronic device, thereby facilitating portability of the device and/or helping prevent damage to the frame and any electronic components attached thereto. In the expanded configuration, the frame can no longer be contained within the base, thereby allowing the frame to provide touchpad functionality when in the expanded configuration. The retractable frame can thus be configured to selectively provide touchpad functionality for the electronic device based on whether the frame is retracted or expanded. The retractable frame can be configured to be retracted in a variety of ways, such as including a foldable member configured to be unfolded and folded so as to selectively provide touchpad access, or including a slidable member configured to be slid so as to selectively provide touchpad access.

A person skilled in the art will appreciate that the devices and methods disclosed herein can be implemented using any type of electronic device. Embodiments of electronic devices include a mobile telephone, a smartphone, a computer (e.g., a laptop or notebook computer, a netbook, a server, a tablet, etc.), a DVD player, a CD player, a portable music player, a gaming system, a television, a radio, a personal digital assistant (PDA), etc. In an embodiment, the electronic device is a portable device configured to be transported by a user between different locations and configured to be placed on a support surface during use and/or for storage. The electronic device can, however, be a non-portable, stationary device.

The term "display" as used herein refers to any of a variety of display devices, e.g., a liquid crystal display (LCD), a light-emitting diode (LED) screen, a cathode ray tube (CRT) screen, a touchscreen, a 3D screen, and the like. Additionally, the term "display" as used herein can refer to a display that is fixedly mounted in the same chassis or package as a base of an electronic device, as well as to displays that are removably and replaceably mounted to the same chassis or package as a base of an electronic device.

FIG. 1B illustrates one embodiment of an electronic device 10 that includes a frame 32 configured to move between a folded configuration and an unfolded configuration. The electronic device 10 in this illustrated embodiment includes a base 14 configured to have a display (not shown) removably and replaceably attached thereto, such as a tablet that includes a display, as will be appreciated by a person skilled in the art. Although the device 10 in this illustrated embodiment includes the base 14 configured to electronically communicate with a display, other embodiments can include other types of electronic devices, as mentioned above. The device 10 can include any of a variety of software and/or hardware components. In addition, although an exemplary device 10 is depicted and described herein, a person skilled in the art will appreciate that this is for sake of generality and convenience. In other embodiments, the electronic device may differ in architecture and operation from that shown and described with respect to any of the illustrated embodiments.

Figure 2:
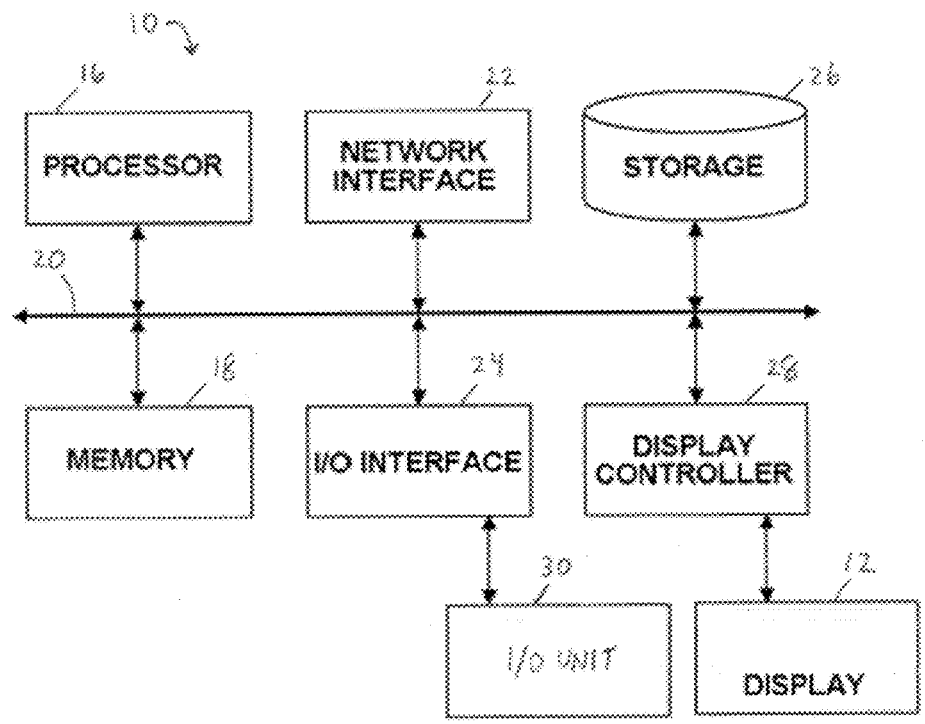
FIG. 2 is a schematic view of components of the electronic device of FIG. 1B.

As shown in FIG. 2, the illustrated device 10 can include a processor 16 which controls the operation of the device 10, for example by executing an operating system (OS), a basic input/output system (BIOS), device drivers, application programs, and so forth. The processor 16 can include any type of microprocessor or central processing unit (CPU), including programmable general-purpose or special-purpose microprocessors and/or any one of a variety of proprietary or commercially-available single or multi-processor systems. The device 10 can also include a memory 18, which can provide temporary storage for code to be executed by the processor 16 or for data that is processed by the processor 16. The memory 18 can include read-only memory (ROM), flash memory, one or more varieties of random access memory (RAM), and/or a combination of memory technologies. The various elements of the device 10 can be coupled to a bus system 20. The illustrated bus system 20 is an abstraction that a person skilled in the art will appreciate represents any one or more separate physical busses, communication lines/interfaces, and/or multi-drop or point-to-point connections, connected by appropriate bridges, adapters, and/or controllers.

The device 10 can also include a network interface 22, an input/output (I/O) interface 24, a storage device 26, and a display controller 28. The network interface 22 can enable the device 10 to communicate with remote devices, e.g., other electronic devices, over a network. The I/O interface 24 can facilitate communication between one or more I/O units 30. A person skilled in the art will appreciate that the device 10 can be configured to communicate with a variety of I/O units 30. Non-limiting examples of input units include a keyboard, a pointing device, and an accelerator element. Non-limiting examples of output units includes a speaker, a printer, a scanner, and a removable memory. The storage device 26 can include any conventional medium for storing data in a non-volatile and/or non-transient manner. The storage device 26 can thus hold data and/or instructions in a persistent state, i.e., the value is retained despite interruption of power to the device 10. The storage device 26 can include one or more hard disk drives, flash drives, universal serial bus (USB) drives, optical drives, various media disks or cards, and/or any combination thereof, and can be directly connected to the other components of the device 10 or remotely connected thereto, such as over a network. The display controller 28 can include a video processor and a video memory, and can generate images to be displayed on a display 12 in accordance with instructions received from the processor 16. As mentioned above, the display 12 can be configured to be removably and replaceably attached to the base 14. The base 14 can include the processor 16, the memory 18, the bus system 20, the network interface 22, the I/O interface 24, the storage device 26, and the display controller 28.

One or more software modules can be executed by the device 10 to facilitate human interaction with the device 10. These software modules can be part of a single program or one or more separate programs, and can be implemented in a variety of contexts, e.g., as part of an operating system, a device driver, a standalone application, and/or combinations thereof. A person skilled in the art will appreciate that any software functions being performed by a particular software module can also be performed by any other module or combination of modules.

As shown in FIG. 1B, a top surface 34 of the base 14 can have a keyboard 36 thereon. The base 14 can include any number of additional elements. Non-limiting examples of elements that can be included with the base 14 are a media drive (e.g., a disk drive, a DVD drive, etc.), a port (e.g., a USB port, a FireWire port, an Ethernet port, etc.), a power control (e.g., a button, a switch, etc.), a WiFi network switch, a power cord outlet, a pointing stick, a jog ball, an optical scanner, a joystick, a parameter control (e.g., brightness, contrast, etc.), a close or lock latch to help hold the device 10 closed, etc. In the illustrated embodiment, the base 14 includes in a housing thereof the processor 16, the memory 18, the bus system 20, the network interface 22, the I/O interface 24, the storage device 26, and the display controller 28 illustrated in FIG. 2. In other embodiments, as will be appreciated by a person skilled in the art, any one or more of the processor 16, the memory 18, the bus system 20, the network interface 22, the I/O interface 24, the storage device 26 can be located external to the base 14, e.g., a tablet attached to the base 14, an external storage device plugged into a USB port, etc.

The frame 32 can define a perimeter of a touchpad area 38. The touchpad area 38 can be configured to receive spatial input, as will be appreciated by a person skilled in the art. Touchpad functionality of the touchpad area 38 can generally allow movement control of a pointing device, such as a cursor on the display in electronic communication with the base 14. Examples of touchpad functionality are described further in U.S. Pat. No. 6,480,187 entitled "Optical Scanning-Type Touch Panel" filed Apr. 17, 1998, and U.S. Pat. Pub. No. 2010/0238138 entitled "Optical Touch Screen Systems Using Reflected Light" filed Apr. 15, 2010.

Figure 1A:
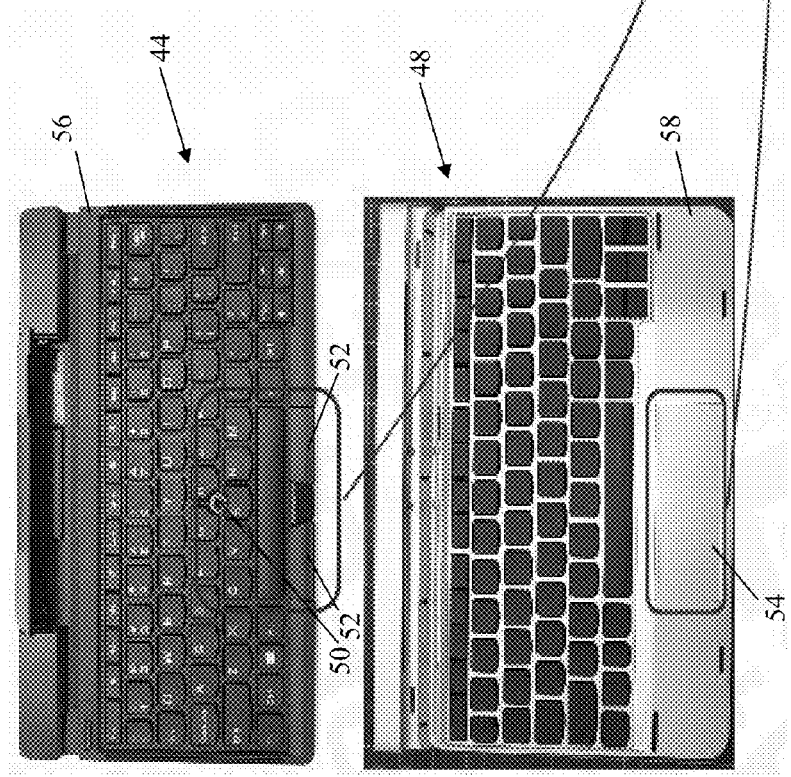
FIG. 1A is a perspective view of two prior art electronic devices.

FIGS. 1A and 1B illustrate touchpad functionality that can be accomplished using the frame 32 and the touchpad area 38 by way of comparison with a first (prior art) electronic device 44 and a second (prior art) electronic device 48. The first and second electronic devices 44, 48 each include a base 56, 58 configured to have a display (not shown) removably and replaceably attached thereto. The touchpad functionality of the frame 32 and the touchpad area 38 can be akin to functionality of a pointing stick 50 and selection buttons 52 of the first electronic device 44, and can be akin to functionality of a built-in touchpad 54 on a surface of the base 58 of the second electronic device 48. Similarly, the frame 32 can be located below the keyboard 36, similar to positioning of the selection buttons 52 of the first electronic device 44 and to positioning of the built-in touchpad 54 of the second electronic device 48. The frame 32 can be located in another position relative to the keyboard 36, e.g., to a left side thereof. In some embodiments, an electronic device can include a first foldable frame on a left side of the device's keyboard and a second foldable frame on a right side of the keyboard. Having frames on left and right sides of the keyboard can accommodate usage of touchpad areas defined by the foldable frames by a right hand or a left hand of a user, at the user's discretion and comfort. An electronic device can have a frame located below an electronic device's keyboard in addition to left and/or right side frames.

Figure 3:
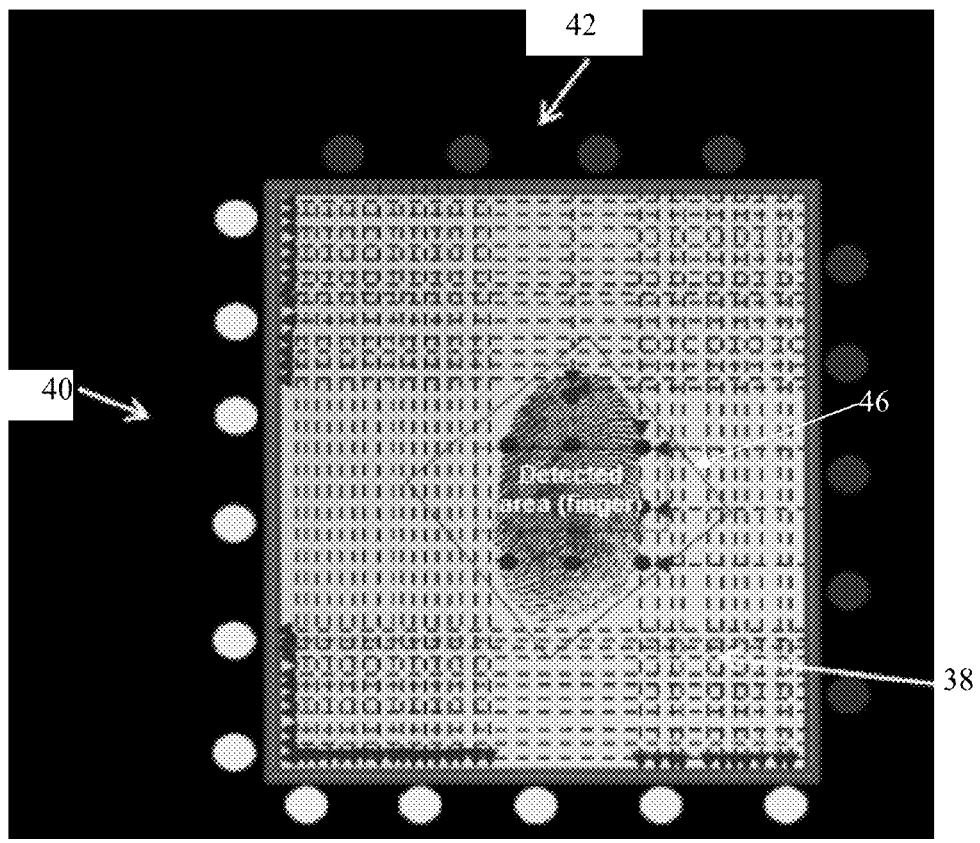
FIG. 3 is a top view of an embodiment of a touchpad area defined by the frame of FIG. 1B.

FIG. 3 illustrates an exemplary embodiment of the touchpad area 38. The touchpad area 38 can be surrounded by a plurality of sensors, such as photo diodes 40, and a plurality of light sources, such as infrared (IR) light emitting diodes (LEDs) 42. As will be appreciated by a person skilled in the art, other types of sensors and other types of light sources can be used. As will also be appreciated by a person skilled in the art, when touch is applied within the touchpad area 38, e.g., a user moves their finger into and/or within the touchpad area 38, light emitted by the IR LEDs 42 will be interrupted within the area 38. Light sensed by the photo diodes 40 will thus change, thereby allowing the touch input to be sensed and processed to cause movement of a pointing device, such as a cursor on the display in electronic communication with the base 14. The processing can be performed by the processor 16 and/or one or more other processors. Examples of arrangements of lined up light sources and sensors are described in further detail in U.S. Pat. Pub. No. 2010/0238138 entitled "Optical Touch Screen Systems Using Reflected Light" filed Apr. 15, 2010.

The touchpad area 38 can be an open area, e.g., an empty space, with a table or other support surface on which the base 14 rests serving as a touch surface within the touchpad area 38. However, a touch surface is not necessary, as the photo diodes 40 and the IR LEDs 42 can be configured to sense input by a finger or other object moving into or moving within the touchpad area 38 so as to sense input without the finger or other object touching any portion of the device 10 or any support surface upon which the device 10 may be resting. The open area within the touchpad area can allow the electronic device's touchpad functionality to include fewer components than many traditional touchpads, which often require electronic and/or other components within an interior thereof in order to properly function.

A total number of the photo diodes 40 and a total number of the IR LEDs 42 can vary based on, e.g., a size of the frame 32, a size of the IR LEDs 42, and a size of the photo diodes 40. As will be appreciated by a person skilled in the art, light emitted from each one of the IR LEDs 42 can be detected by one or more of the photo diodes 40, so a number of the photo diodes 40 can be greater than a number of the IR LEDs 42. In some embodiments, a number of photo diodes and a number of IR LEDs can be equal.

A first number of the photo diodes 40 can be located on a first side of the touchpad area 38, and a remaining number of the photo diodes 40 can be located on a second, adjacent side of the touchpad area. Similarly, a first number of the IR LEDs 42 can be located on a third side of the touchpad area 38, and a remaining number of the IR LEDs 42 can be located on a fourth, adjacent side of the touchpad area 38.

A subset of the photo diodes 40 and the IR LEDs 42 can be attached to the frame 32 (not shown in FIG. 3), and a remainder of the photo diodes 40 and the IR LEDs 42 can be attached to the base 14 (not shown in FIG. 3). For example, the photo diodes 40 and the IR LEDs 42 on three of the four sides surrounding the touchpad area 38 can be attached the frame 32. The photo diodes 40 and/or the IR LEDs 42 on the fourth side surrounding the touchpad area 38 can be attached the base 14. The frame 32 and a portion of the base 14 can thus define a perimeter of the touchpad area 38.

Figure 4:
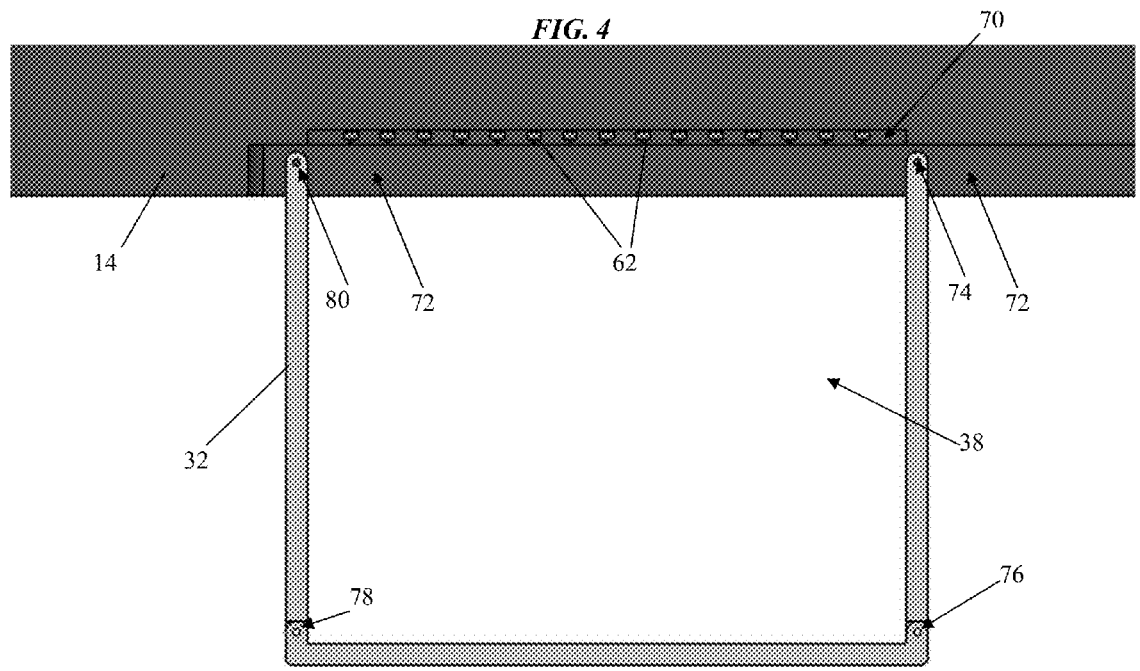
FIG. 4 is a partial view of a bottom side of the electronic device and the frame of FIG. 1B, the frame being in an expanded configuration.
Figure 5:
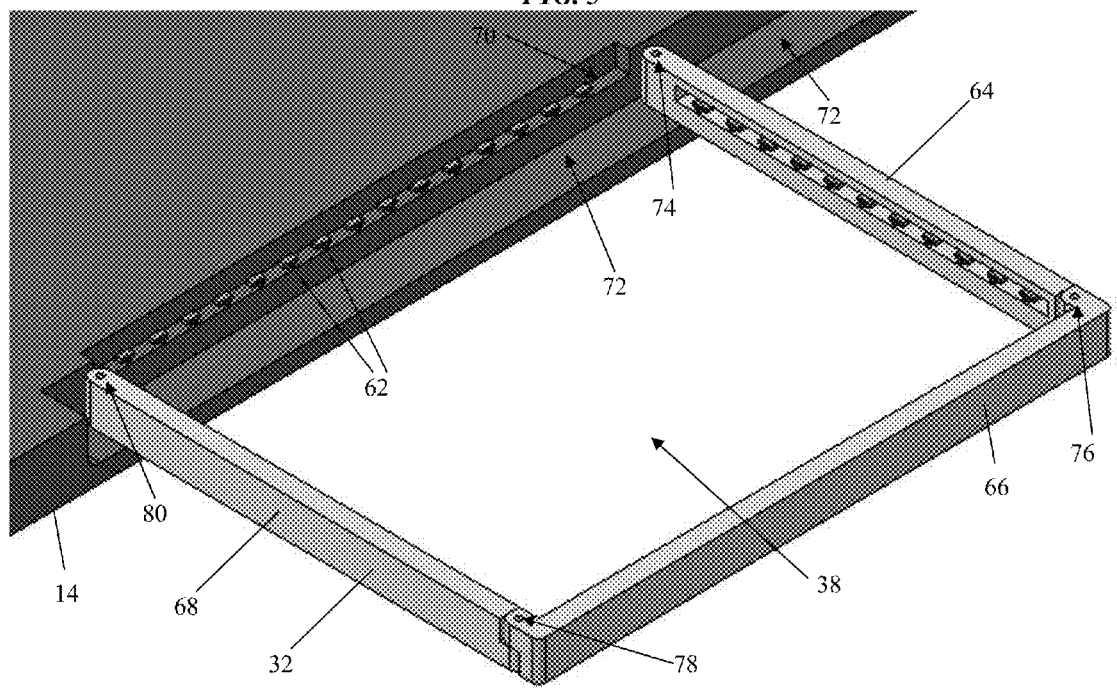
FIG. 5 is a perspective, partial view of the bottom side of the electronic device and the frame of FIG. 4.

FIGS. 4-8 illustrate the base 14 and the frame 32 of FIG. 1B with a plurality of photo diodes 60 and a plurality of IR LEDs 62 attached thereto and surrounding the touchpad area 38. As shown in FIGS. 4-6, a subset of the IR LEDs 62 can be attached to the base 14. The base 14 can include a first recessed area 70 formed therein in which the subset of the IR LEDs 62 can be attached to the base 14. The first recessed area 70 can help protect the subset of the IR LEDs 62 from being damaged when the base 14 is resting on a table or other support surface and when the frame 32 is in the folded configuration. A remaining number of the IR LEDs 62 can be attached to the frame 32, e.g., to a first leg 64 of the frame 32 that can be hingedly attached to the base 14, as discussed further below. The IR LEDs 62 attached to the frame 32 can be attached thereto on an inner-facing surface thereof, as in this illustrated embodiment, which can help hide and protect the IR LEDs 62 from being damaged when the frame 32 is in the folded configuration. Although fifteen IR LEDs 62 are attached to the base 14 and twelve IR LEDs 62 are attached to the first leg 64 in this illustrated embodiment, a different number of IR LEDs 62 can be attached to the base 14 and the first leg 64, as mentioned above. As shown in FIGS. 7 and 8, a subset of the photo diodes 60 can be attached to the frame 32, e.g., to a second leg 66 of the frame 32 that can be hingedly attached to the first leg 64 and that can be hingedly attached to a third leg 68 of the frame 32, as discussed further below. As shown in FIGS. 6 and 7, a remainder of the photo diodes 60 can be attached to the frame 32, e.g., to the third leg 68 of the frame 32 that can hingedly attached to the base 14, as discussed further below. The photo diodes 60 attached to the second leg 66 can be attached thereto on an inner-facing surface thereof, and the photo diodes 60 attached to the third leg 68 can be attached thereto on an inner-facing surface thereof, as in this illustrated embodiment, which can help hide and protect the photo diodes 60 from being damaged when the frame 32 is in the folded configuration. Although sixteen photo diodes 60 are attached to the second leg 66 and photo diodes 60 are attached to the third leg 68 in this illustrated embodiment, a different number of photo diodes 60 can be attached to the second and third legs 66, 68, as mentioned above.

Figure 9:
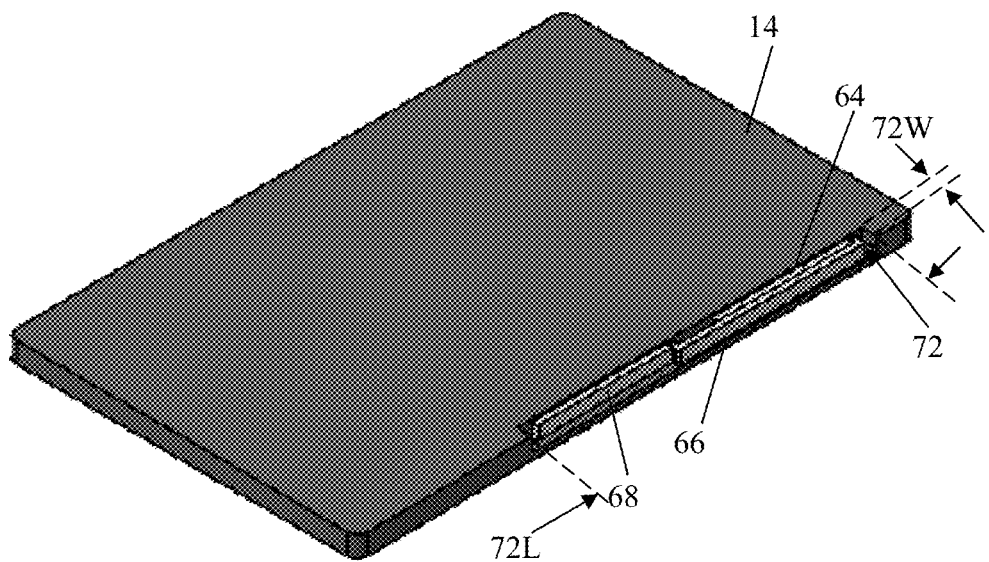
FIG. 9 is a perspective, bottom view of the electronic device and the frame of FIG. 1B, the frame being in a retracted configuration.
Figure 10:
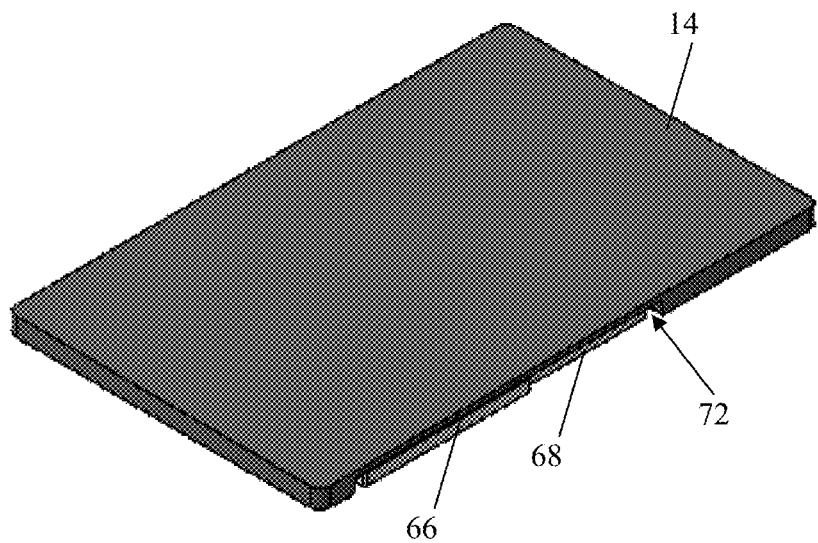
FIG. 10 is a perspective, top view of the electronic device and the frame of FIG. 9.

When the frame 32 is in the unfolded configuration, as shown in FIGS. 1 and 4-8, the IR LEDs 62 and the photo diodes 60 can be exposed and facing the touchpad area 38. In this way, the IR LEDs 62 and the photo diodes 60 can cooperate to provide touchpad functionality. When the frame 32 is in the folded configuration, as shown in FIGS. 9 and 10, the IR LEDs 62 and the photo diodes 60 can be unexposed, and the touchpad area 38 can be unexposed and collapsed. In this way, the touchpad area 38 can be inaccessible for touch input thereto when the frame 32 is in the folded configuration, while the touchpad area 38 can be exposed and expanded when the frame 32 is in the unfolded configuration. The touchpad area 38 can thus be prevented from inadvertently receiving input when the frame 32 is folded, as the frame 32 being folded can indicate that the device 10 is not currently in use by a user and/or is being transported.

The base 14 can include a second recessed area 72 formed therein that can be configured to seat the frame 32 therein when the frame 32 is in the folded configuration. The second recessed area 72 can be formed at an edge of the base 14, as shown in FIGS. 4-10, which can facilitate easy access to the frame 32 for easy manual unfolding and folding thereof. The second recessed area 70 configured to seat the subset of the IR LEDs 62 can be a sub-recess of the second recessed area 72, as shown in FIGS. 5 and 6. The second recessed area 72 can have a length 72L greater than a maximum length of any of the first, second, and third foldable legs 64, 66, 68 of the frame 14. The length 72L of the second recessed area 72 can accordingly be greater than a maximum length of the frame 32 and a maximum width of the frame 32. The maximum width of the frame 32 can be defined by a length of the second leg 66. The maximum length of the frame 32 can be defined by lengths of the first and third legs 64, 68, which can have the same length. The second recessed area 72 can have a width 72W sized to allow the frame 32 in the folded configuration to be seated within an outer perimeter of the base 14, thereby helping to protect the frame 32 by allowing the frame 32 to be fully seated within the base's outer perimeter when the frame 32 is folded.

Figure 11:
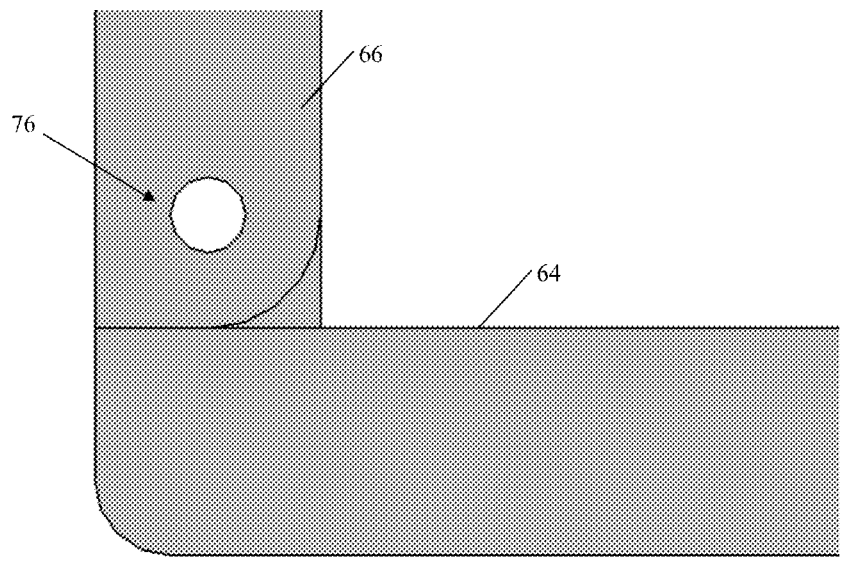
FIG. 11 is a top view of a hinge of the frame of FIG. 1B.
Figure 12:
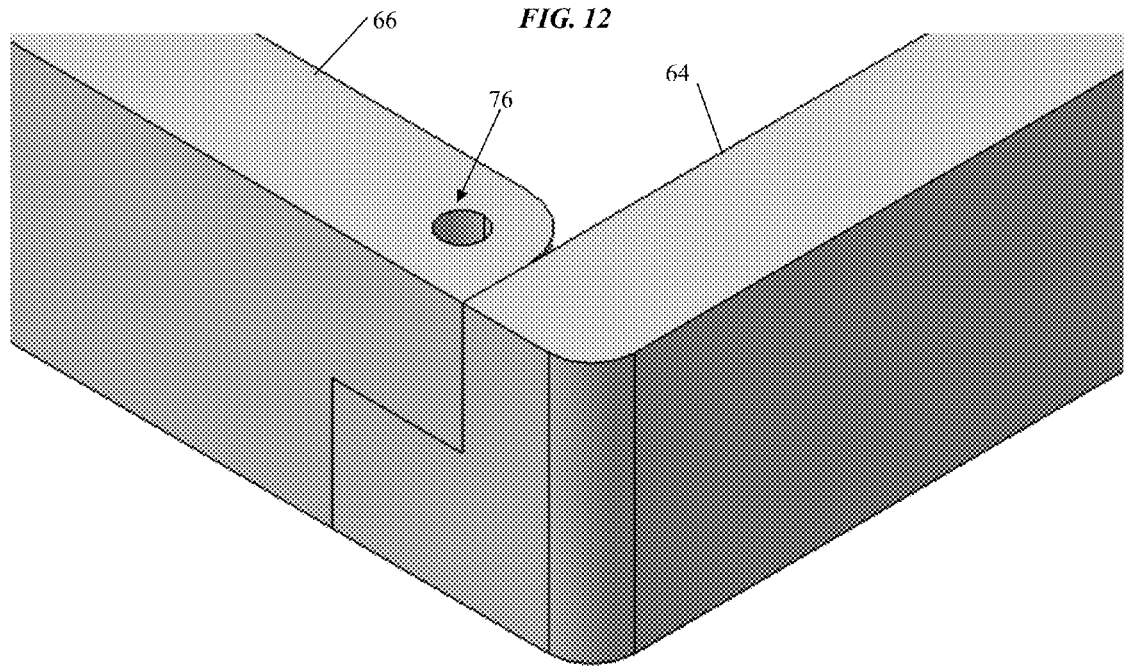
FIG. 12 is a perspective view of the hinge of FIG. 11.
Figure 13:
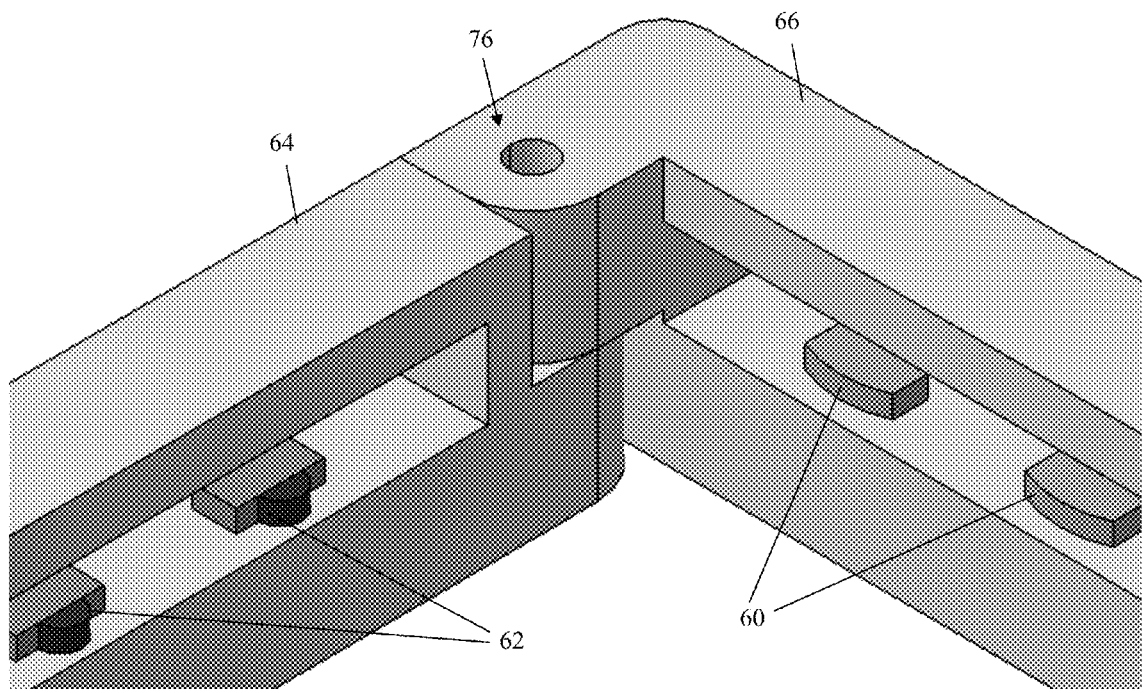
FIG. 13 is another perspective view of the hinge of FIG. 11.

As mentioned above, and as shown in FIGS. 4-8, each of the first, second, and third legs 64, 66, 68 of the frame 32 can be hingedly attached to at least one other one of the legs 64, 66, 68. The various hinged attachments of the legs 64, 66, 68 and the base 14 can facilitate folding and unfolding of the frame 32. The hinged attachments can have a variety of configurations. The first leg 64 can have a first end thereof hingedly attached to the base 14 at a first pivot point 74 and can have a second end thereof hingedly attached to a first end of the second leg 66 at a second pivot point 76. FIGS. 11-13 also show the connection of the first and second legs 64, 66 at the second pivot point 76. The second leg 66 can have a second end thereof hingedly attached to a first end of the third leg 68 at a third pivot point 78. The third leg 68 can have a second end thereof hingedly attached to the base 14 at a fourth pivot point 80. The four pivot points 74, 76, 78, 80 can cooperate to allow hinged opening and closing of the frame 32 between the folded and unfolded configurations. The four pivot points 74, 76, 78, 80 can, as in this illustrated embodiment, be at each corner of the touchpad area 38.

The frame 32 can have a first shape, e.g., an elongate, linear shape in which the legs 66, 68, 70 are generally in-line, when in the folded configuration and can have a second, different shape, e.g., a U-shape in which adjacent ones of the legs 66, 68, 70 are at right angles to one another. The angles may not be precisely right angles, as will be appreciated by a person skilled in the art, due to one or more factors, such as manufacturing tolerances. A perimeter of the second shape can define a larger internal area than an internal area defined by a perimeter of the first shape. In other words, the frame 32 moving from the folded configuration to the unfolded configuration can allow for the touchpad area 38 within an internal area defined by a perimeter of the frame 32 to increase in size and, hence, facilitate user touch therein. As the frame 32 transitions from the first shape to the second shape, the frame 32 can have an intermediate shape, e.g., a parallelogram shape, as the legs 66, 68, 70 unfold from within the second recessed area 72.

Figure 14:
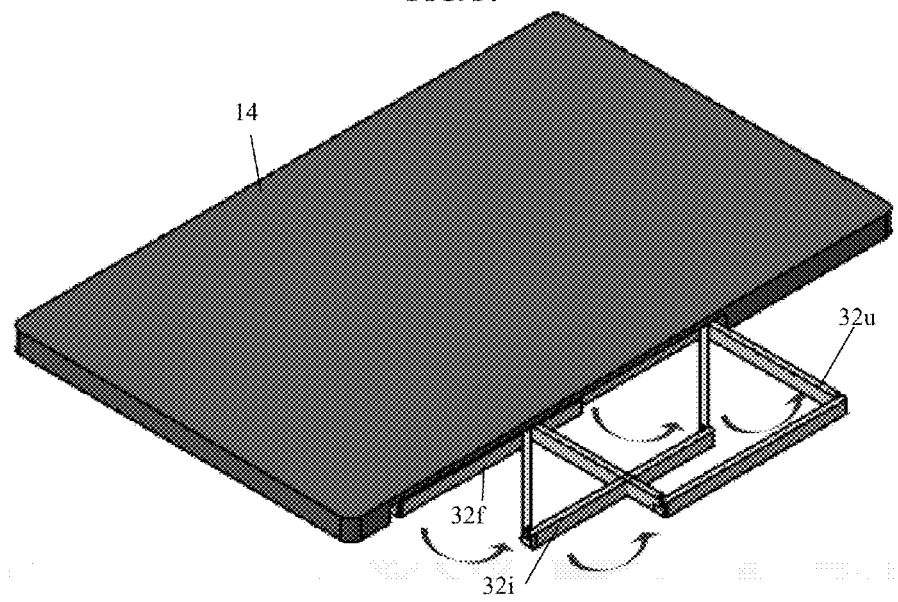
FIG. 14 is a perspective, top view of the electronic device and the frame of FIG. 1B, the frame being shown in a series of foldable positions.
Figure 15:
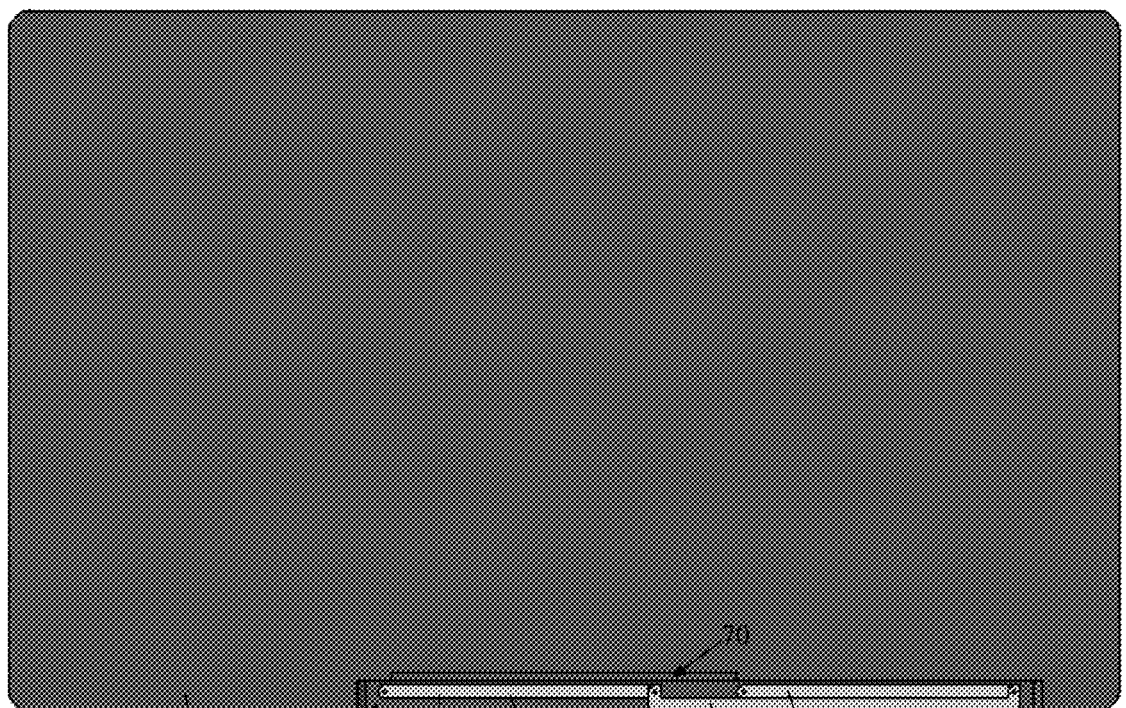
FIG. 15 is a bottom view of the electronic device and the frame of FIG. 9.
Figure 16:
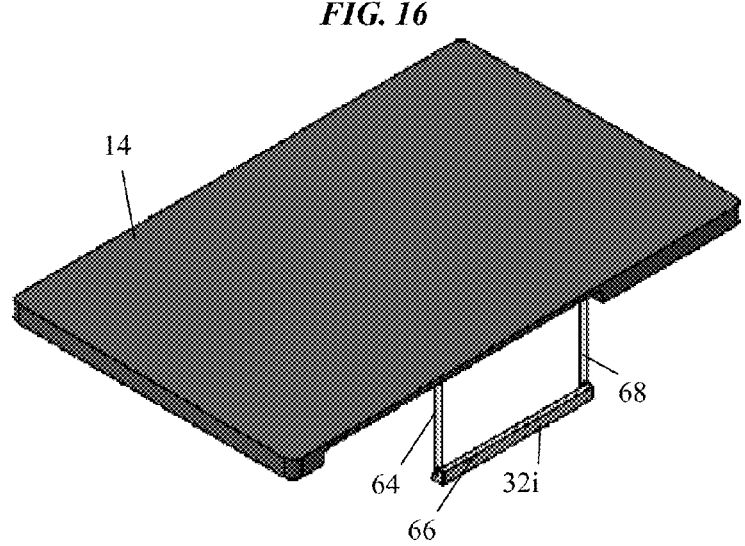
FIG. 16 is a perspective, top view of the electronic device and the frame of FIG. 15, the frame moved from the retracted configuration to an intermediate configuration.
Figure 17:
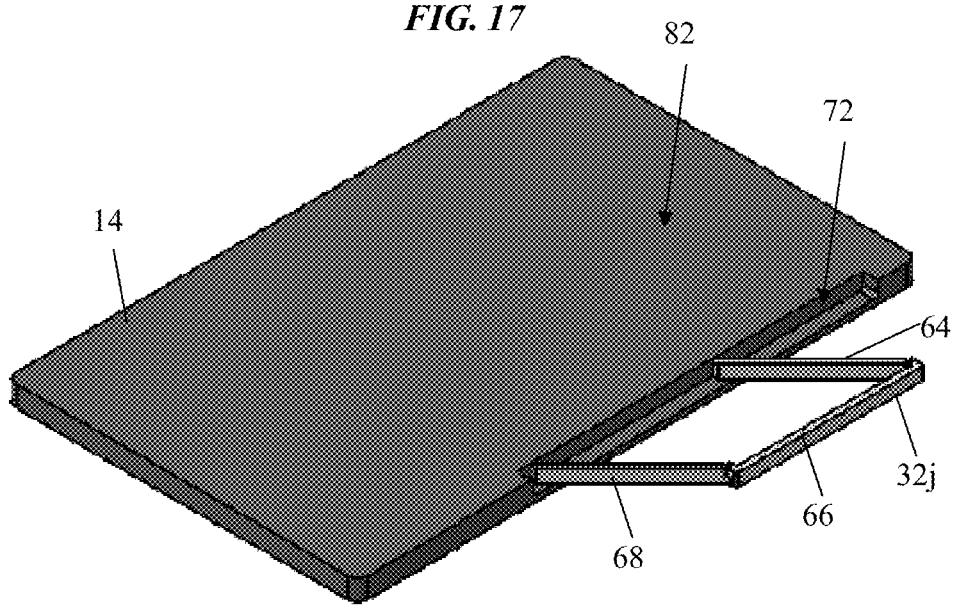
FIG. 17 is a perspective, bottom view of the electronic device and the frame of FIG. 16, the frame moved from the intermediate configuration to another intermediate configuration.
Figure 18:
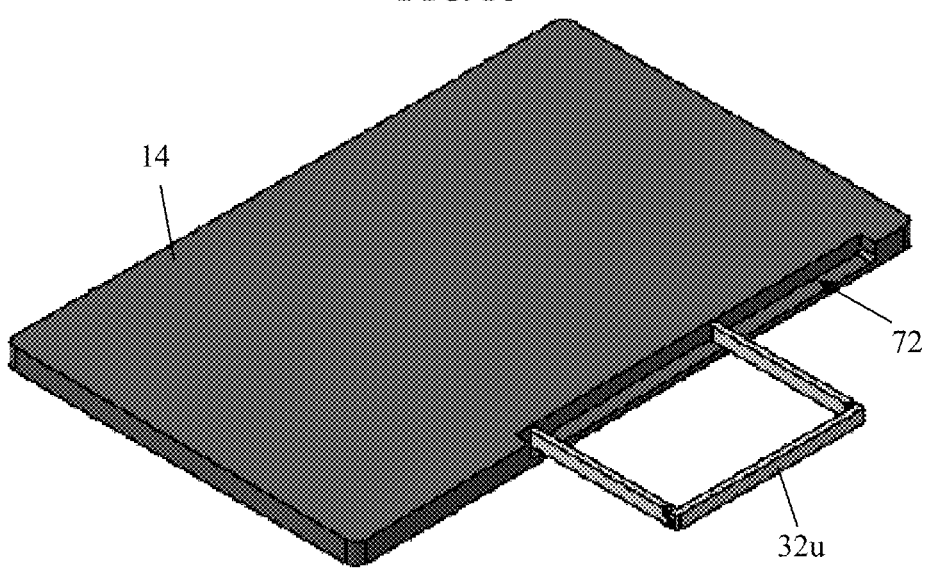
FIG. 18 is a perspective, bottom view of the electronic device and the frame of FIG. 17, the frame moved from the other intermediate configuration to the expanded configuration.
Figure 19:
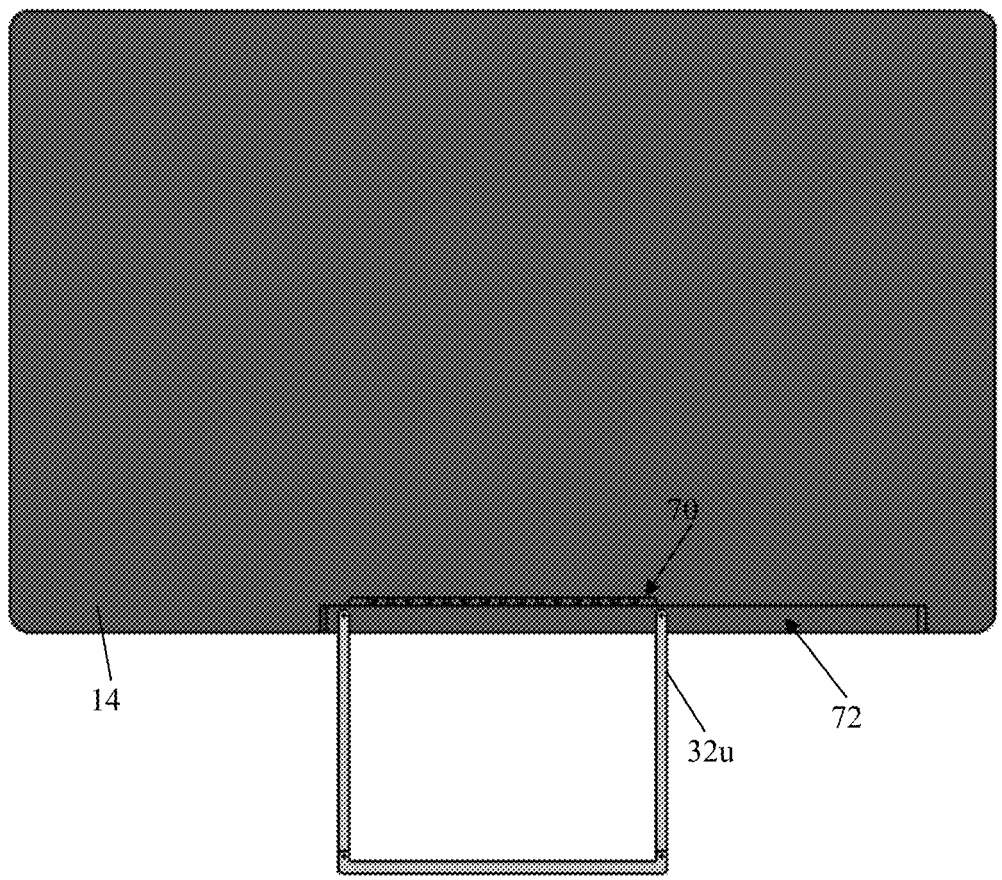
FIG. 19 is a bottom view of the electronic device and the frame of FIG. 18.
Figure 20:
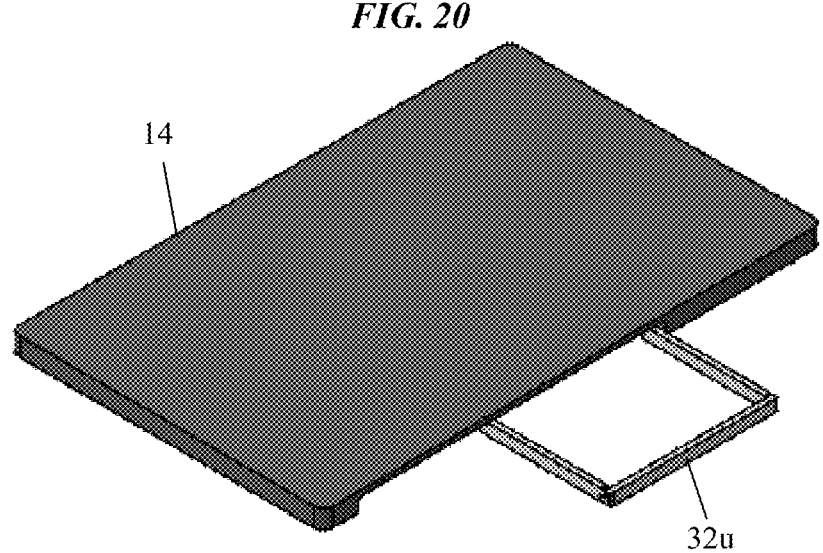
FIG. 20 is a perspective, top view of the electronic device and the frame of FIG. 19.
Figure 21:
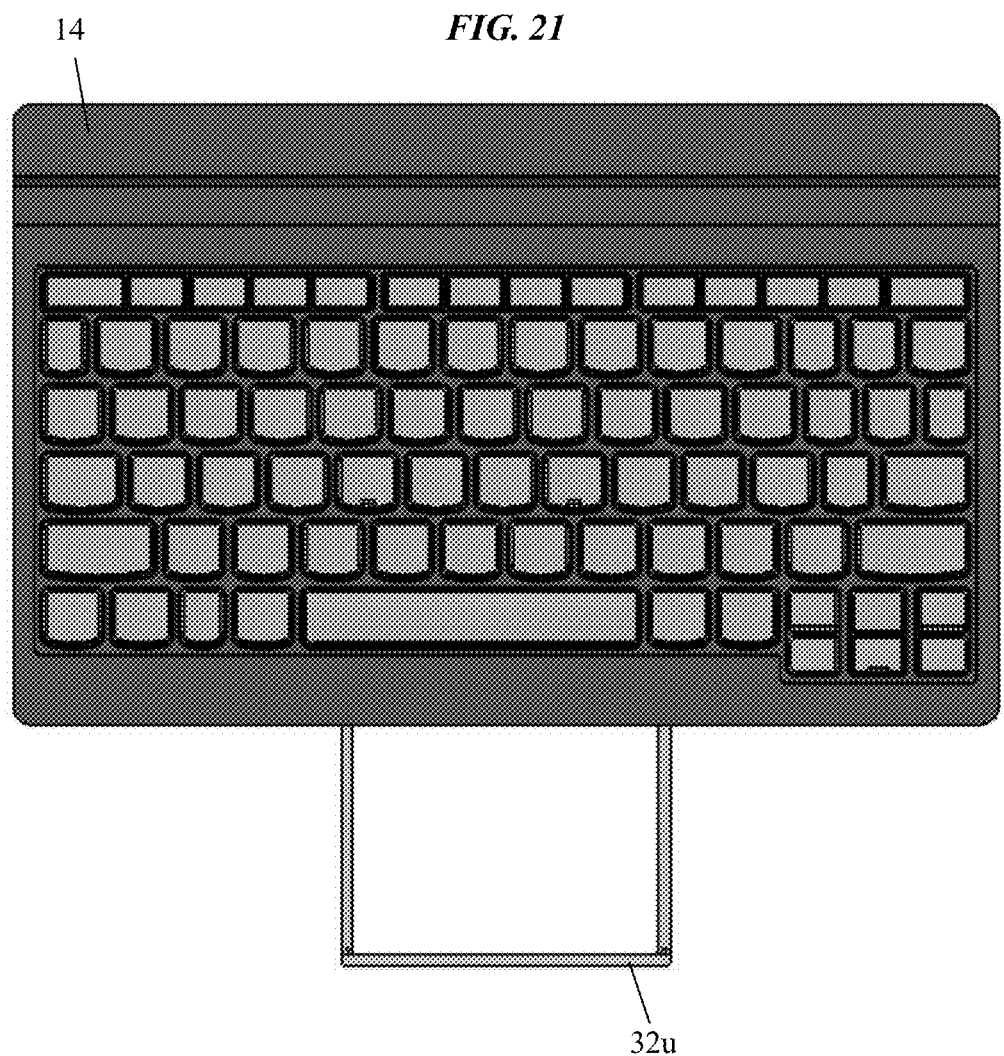
FIG. 21 is a top view of the electronic device and the frame of FIG. 20.
Figure 22:
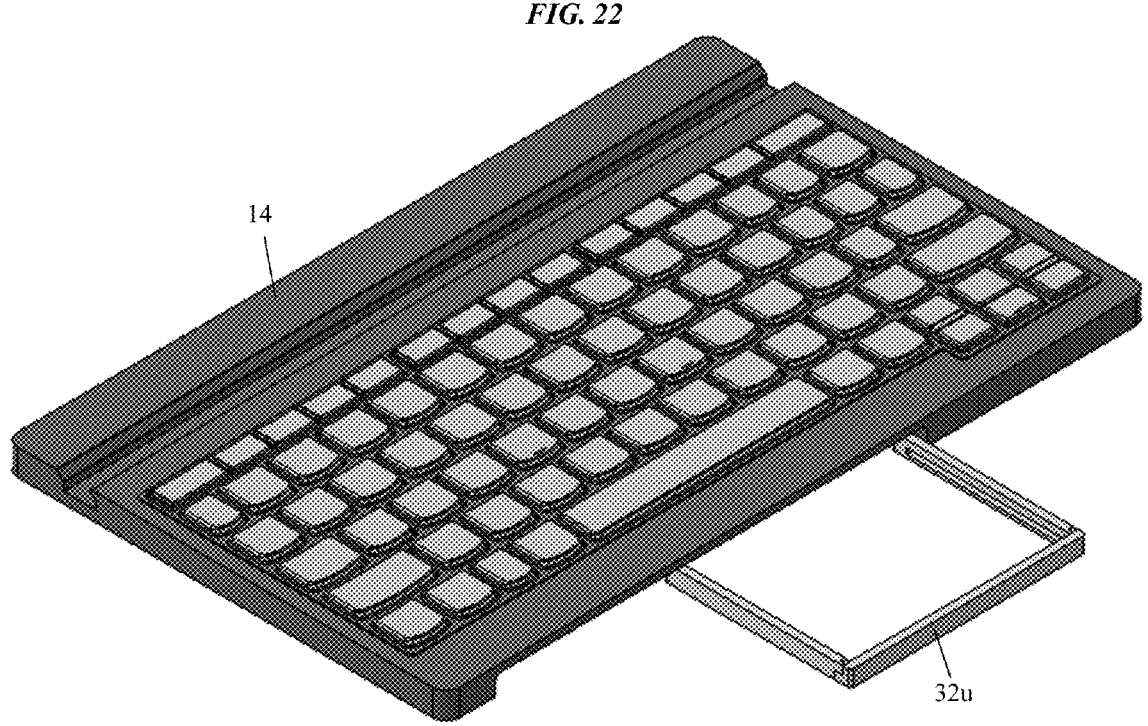
FIG. 22 is a perspective, top view of the electronic device and the frame of FIG. 21.

FIG. 14 illustrates movement of the frame 32 from the folded configuration (the frame 32 identified with reference 32*f*) to the unfolded configuration (the frame 32 identified with reference 32*u*) with an intermediate configuration (the frame 32 identified with reference 32*i*) therebetween. Only one intermediate configuration is shown in FIG. 14, but the frame 32 will have a plurality of intermediate configurations as the frame 32 moves between the folded and unfolded configurations. FIGS. 15-22 also illustrate movement of the frame 32 from the folded configuration 32*f* (FIG. 15) to the unfolded configuration 32*u* (FIGS. 18-22), with the intermediate configuration 32*i* (FIG. 16) being after the folded configuration 32*f* and a second intermediate configuration 32*j* (FIG. 17) being after the intermediate configuration and before the unfolded configuration 32*u*. As the frame 32 moves between the unfolded configuration 32*u* and the folded configuration 32*f*, the legs 64, 66, 68 can pivot at their associated ones of the pivot points 74, 76, 78, 80 so as to expand the frame 32 (in the case of moving toward the unfolded configuration) or collapse the frame 32 (in the case of moving toward the folded configuration). The frame 32 can move relative to the base 14 as the frame folds/unfolds.

The frame 32 can be configured to be manually moved by hand between the unfolded configuration 32*u* and the folded configuration 32*f*, e.g., by grasping one or more of the legs 64, 66, 68 by hand and folding or unfolding the frame 32 to a desired configuration. The frame 32 can be manually moved using something other than direct hand contact, such as by using a tool (e.g., a pencil tip, a paper clip, etc.) to push the frame 32 into a desired configuration.

As shown in FIGS. 9, 13, and 17-19, a bottom surface 82 of the base 14 that is opposite to the top surface 34 can be configured to rest on a table or other support surface during use of the device 10, as will be appreciated by a person skilled in the art. The bottom surface 82 in this illustrated embodiment does not include any feet or other stabilization members that conventional electronic devices typically include to steady the device when resting on a support surface to help prevent tipping or rollover of the device. Such stabilization members are not necessary for the device 10 because the frame 32 in the unfolded configuration can serve as a stabilization member configured to help prevent tipping or rollover of the device 10. Lacking stabilization members can help reduce a weight of the device 10 and/or can help simplify, and accordingly reduce cost, of manufacturing of the device 10.

In another embodiment of an electronic device (not shown), the electronic device can include a frame configured to move between a folded configuration and an unfolded configuration but instead of including light sources and sensors aligned along legs of a frame, as with the frame 32 in the embodiment of FIG. 1B, the frame can include light sources and sensors at corners thereof. Examples of arrangements of light sources and sensors at corners are described in further detail in U.S. Pat. No. 6,480,187 entitled "Optical Scanning-Type Touch Panel" filed Apr. 17, 1998.

FIG. 23B illustrates another embodiment of an electronic device 100 that includes a frame (not shown) configured to move between a folded configuration and an unfolded configuration. The frame is in the folded configuration in FIG. 23B and is represented in dark outline 102 in the unfolded configuration in FIG. 23B. The device 100 includes the frame configured to provide touchpad functionality, e.g., using photo diodes and IR LEDs. The device 100 also includes a pointing stick 104 and selection buttons 106 configured to provide touchpad functionality. A user of the device 100 can thus choose whether to use the frame and/or the pointing stick 104 and the selection buttons 106 to achieve touchpad functionality, e.g., to move a cursor, thereby providing a more versatile user experience.

Similar to that discussed above, the frame of the device 100 can include first, second, and third legs (not shown). The first leg can have a first end thereof hingedly attached to a base 108 of the device 100 at a first pivot point (not shown) and can have a second end thereof hingedly attached to a first end of the second leg at a second pivot point (not shown). The second leg can have a second end thereof hingedly attached to a first end of the third leg at a third pivot point (not shown). The third leg can have a second end thereof hingedly attached to the base 108 at a fourth pivot point (not shown).

The base 108 can include a recessed area (not shown) on a bottom surface (not shown). The recessed area can, as discussed above, be configured to seat the frame therein when the frame is in the folded configuration.

The frame can be located below the keyboard 110 of the device 100, as shown in the embodiment of FIG. 23B. FIG. 23A shows a prior art electronic device 114 for comparison purposes. Both of the devices 100, 114 include a pointing stick 104 and selection buttons 106 that can facilitate movement of a cursor, but only the device 100 of FIG. 23B includes a foldable frame that can facilitate movement of a cursor. As demonstrated by a comparison of a light outline 112 around a portion of the device 100 toward a bottom side of the base 110 and a second light outline 116 around a portion of the device 114 toward a bottom side of a base 118 of the device 114, the keyboard 110 of the device 100 that includes the foldable frame can be closer to a user typing normally on the keyboard 110 than to a user typing normally on a keyboard 120 of the device 114 that does not include a foldable frame. The device 100 with the foldable frame can thus be easier and/or more comfortable for the user to use than the device 114 without a foldable frame. Additionally, as mentioned above, the device 100 need not include feet and/or other stabilizing members, whereas the device 114 without the foldable frame does include stabilizing members in the form of retractable feet (not shown) on a bottom surface thereof. The device 100 with the foldable frame can thus be lighter and/or easier to manufacture than the device 114 without a foldable frame that can keep stabilize the device 114.

FIG. 24 illustrates another embodiment of an electronic device 200 that includes a frame 202. The frame 202 in this illustrated embodiment is configured to move between an exposed configuration and an unexposed configuration. The frame 202 is in the exposed configuration in FIG. 24. In the exposed configuration, a touchpad area 204 defined by a perimeter of the frame 202 can be exposed and available for touching by a user similar to the unfolded frame 32 in the embodiment of FIG. 1B. In this illustrated embodiment, the frame 202 in the exposed configuration is located on a right side of the electronic device's keyboard 204. A base 206 of the device 200 can include a track (not shown) formed therein. The track can, similar to the recessed area discussed above for a foldable frame, be configured to seat the frame 202 therein when the frame 202 is in the unexposed configuration. The frame 202 can be configured to slide within the track, thereby allowing the frame 202 to slidably move between the exposed and unexposed configurations. The frame 202 can maintain a same shape in the exposed and unexposed configurations, e.g., maintain a U-shape.

The frame 202 in this illustrated embodiment extends along an entire side of the base 206. In other words, the frame 202 in this illustrated embodiment has a same length as a length of a side of the base 206 from which the frame 202 extends. However, a slidable frame similar to the frame 202 can, similar to the frame 32 in the embodiment of FIG. 1B, have a length less than a length of side of a electronic device's base to which it is attached.

Although the invention has been described by reference to specific embodiments, a person skilled in the art will understand that numerous changes may be made within the spirit and scope of the inventive concepts described. A person skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A device comprising:
    a frame that defines a perimeter that surrounds a touch input area, the frame being configured to move between a first configuration, in which the touch input area is inaccessible for receiving touch input, and a second configuration, in which the touch input area is accessible for receiving touch input, the frame including a plurality of light sensors attached along the perimeter thereof; and
    a base attached to the frame, the base including a recessed area, the recessed area including a plurality of light sources disposed along a surface thereof, the light sources in the recessed area being configured to remain exposed in a planar view of the touch input area while the frame is in the second configuration.

2. The device of claim 1 wherein the base is configured to define a maximum perimeter, the frame being contained entirely within the maximum perimeter in the first configuration, and at least a portion of the frame being positioned outside the maximum perimeter in the second configuration.

3. The device of claim 1 wherein the perimeter of the frame is configured to define a first shape in the first configuration and define a second shape, in the second configuration, the first shape being different from the second shape.

4. The device of claim 1 wherein the frame is configured to move between the first and second configurations by pivoting a first end and a second end of the frame relative to the base.

5. The device of claim 1 wherein the frame includes:
    a first leg including a first end hingedly attached to the base and including a second end;
    a second leg including a third end and including a fourth end hingedly attached to the second end; and
    a third leg including a fifth end hingedly attached to the base and including a sixth end hingedly connected to the third end.

6. The device of claim 1 wherein the frame has a same shape in the first configuration and in the second configuration and the frame is configured to slidably move between the first and second configurations.

7. The device of claim 1 wherein the base includes a keyboard.

8. A device comprising:
    a frame that is movable between a folded configuration and an unfolded configuration, movement of the frame between the folded configuration and the unfolded configuration causing the frame to define a shape having a perimeter, the frame including a plurality of light sensors attached along the perimeter; and
    a base attached to the frame, the base including a recessed area, the recessed area including a plurality of light sources disposed along a surface thereof, the light sources in the recessed area being configured to remain exposed in a planar view of the perimeter while the frame is in the unfolded configurations.

9. The device of claim 8 wherein the frame includes a plurality of legs, the plurality of sensors and the plurality of light sources being disposed within the plurality of legs and the legs forming the perimeter of the shape.

10. The device of claim 9 wherein:
    when the frame is in the folded configuration, the legs are arranged to be in line with each other; and
    when the frame is in the unfolded configuration, the legs arranged to define a U-shape.

11. The device of claim 8 wherein the frame includes:
    a first leg including a first end and including a second end, the first end being hingedly attached to the base;
    a second leg including a third end and including a fourth end, the third end being hingedly attached to the second end; and
    a third leg including a fifth end and including a sixth end, the fifth end being hingedly connected to the third end and the sixth end being hingedly attached to the base.

12. The device of claim 8 wherein the base includes a keyboard.

13. A method comprising:
moving a frame, attached to a base of an electronic device, to move the frame between a first configuration, in which a plurality of sensors attached to the frame are unaligned from a plurality of light sources attached along a perimeter of the frame and a recessed area included in the base, such that the plurality of sensors are unable to sense light emitted from the plurality of lights sources, and a second configuration, in which the plurality of sensors are exposed in a planar view of the perimeter and aligned with plurality of light sources, such that the plurality of sensors are configured to sense light emitted from the plurality of lights sources.

14. The method of claim 13 further including moving the frame by pivoting the frame relative to the base.

15. The method of claim 13 further including moving the frame by sliding the frame relative to the base.

16. The method of claim 13 wherein the frame is configured to define a first shape in the first configuration and a second shape in the second configuration, the first shape being different from the second shape.

17. The method of claim 13 wherein the base is configured to define a maximum perimeter and further including moving the frame between being contained entirely within the maximum perimeter in the first configuration and being at least partially positioned outside the maximum perimeter in the second configuration.

18. A device comprising:
a base;
a frame attached to the base, the frame defining a perimeter that surrounds a touch input area, the frame being configured to move between a first configuration, in which the touch input area is inaccessible for receiving touch input, and a second configuration, in which the touch input area is accessible for receiving touch input; and
a plurality of light sources and a plurality of sensors attached to the frame along the perimeter thereof; wherein:
a first leg including a first end and including a second end, the first end being hingedly attached to the base;
a second leg including a third end and including a fourth end, the third end being hingedly attached to the second end; and
a third leg including a fifth end and including a sixth end, the fifth end being hingedly connected to the third end and the sixth end being hingedly attached to the base.

* * * * *